(12) United States Patent
Blank

(10) Patent No.: US 11,041,516 B2
(45) Date of Patent: Jun. 22, 2021

(54) POST INTERNAL HANGER ASSEMBLY

(71) Applicant: Stan K Blank, North Salt Lake City, UT (US)

(72) Inventor: Stan K Blank, North Salt Lake City, UT (US)

( * ) Notice: Subject to any disclaimer, the term of this patent is extended or adjusted under 35 U.S.C. 154(b) by 57 days.

(21) Appl. No.: 16/297,312

(22) Filed: Mar. 8, 2019

(65) Prior Publication Data
US 2019/0285104 A1    Sep. 19, 2019

Related U.S. Application Data

(60) Provisional application No. 62/640,439, filed on Mar. 8, 2018.

(51) Int. Cl.
| | | |
|---|---|---|
| *F16B 7/00* | (2006.01) | |
| *F16B 7/04* | (2006.01) | |
| *E04H 17/20* | (2006.01) | |
| *F16M 13/02* | (2006.01) | |
| *E04H 17/00* | (2006.01) | |

(52) U.S. Cl.
CPC ........... *F16B 7/0413* (2013.01); *E04H 17/20* (2013.01); *F16M 13/02* (2013.01); *E04H 17/006* (2021.01)

(58) Field of Classification Search
None
See application file for complete search history.

(56) References Cited

U.S. PATENT DOCUMENTS

| | | | |
|---|---|---|---|
| 2,249,381 A | | 7/1941 | Gustafson |
| 2,905,445 A | | 9/1959 | Louis |
| 2,957,187 A | * | 10/1960 | Raia ..................... A61G 7/0503 5/503.1 |
| 3,721,463 A | | 3/1973 | Attwood et al. |
| 3,794,826 A | | 2/1974 | Jablonski |
| 4,113,222 A | * | 9/1978 | Frinzel .................. F16B 7/1463 248/412 |
| 4,456,212 A | | 6/1984 | Raftery |
| 4,626,974 A | | 12/1986 | Dean |
| 5,094,418 A | * | 3/1992 | McBarnes, Jr. ....... A61G 7/0503 248/125.1 |
| 5,400,995 A | * | 3/1995 | Boyd ................... A61M 5/1415 248/407 |
| 5,888,014 A | * | 3/1999 | Lung ....................... F16B 2/246 248/410 |

(Continued)

*Primary Examiner* — Steven M Marsh

(74) *Attorney, Agent, or Firm* — Thorpe North & Western, LLP

(57) ABSTRACT

A hanger assembly for hanging objects from a post is disclosed having a pole having an upper end section configured to support an object, and a lower end section configured to extend through a hollow shaft of the post. The hanger assembly comprises an upper stabilization device having a pole receiving aperture for coupling to the pole, and at least one post support member interfaceable to a top portion of the post to support the pole. The hanger assembly includes a lower stabilization device having a pole attachment portion for coupling to the lower end section of the pole. The lower stabilization device can have a vertical profile or outer planar surface adapted to interface an inner surface of the post to laterally stabilize the lower end section of the pole to restrict lateral movement of the lower stabilization device and the pole. Associated fence systems and methods for installing the hanger assembly are disclosed.

22 Claims, 7 Drawing Sheets

(56) References Cited

U.S. PATENT DOCUMENTS

| | | |
|---|---|---|
| 6,216,886 B1 | 4/2001 | Considine |
| 6,834,840 B1 * | 12/2004 | Metz ................... A61M 5/1415 248/161 |
| 2010/0308197 A1 * | 12/2010 | Bishop ..................... F16B 7/14 248/414 |

* cited by examiner

POST INTERNAL HANGER ASSEMBLY

RELATED APPLICATIONS

This application claims the benefit of U.S. Provisional Patent application No. 62/640,439, filed Mar. 8, 2018, which is incorporated by reference.

BACKGROUND

Various rods or poles (e.g., shepherds hooks) are used in landscaping applications to support and hang objects from the rod or pole, such as for hanging flower pots, decorations, lights, and bird feeders. Often times the lower ends of the rods are pierced into the ground surface (e.g., sod), while the upper ends extends generally vertically upwardly for hanging an object, such as a flower pot. However, this set-up consumes space and can be unsightly, and the rods can eventually sag or lean over time due to the weight of the object imparting a bending moment on the rod where it is installed in the ground. Furthermore, suitable penetrable ground surface may also not be conveniently located. In other instances, support beams or brackets are fastened or attached to an existing structure, such as a wall, fence rail, or fence post, such that the support beam or bracket acts as a cantilever from the fence rail or post for providing clearance to hang an object (flower pot, bird feeder, etc.). However, this can also be unsightly and can damage or destroy the existing structure due to fasteners that are drilled into the structure beam or bracket when being installed.

SUMMARY

A hanger assembly can be coupleable to a post for hanging an object from the hanger assembly. The hanger assembly can comprise a pole having an upper end section configured to support an object and a lower end section configured to extend through a hollow shaft of a post. The hanger assembly can comprise an upper stabilization device having a pole receiving aperture for receiving and coupling to the pole, and having at least one post support member interfaceable to a top portion of the post to at least partially support the pole. The hanger assembly can comprise a lower stabilization device having a pole attachment portion for coupling to the lower end section of the pole. The lower stabilization device is sized to be disposed through a top opening of the hollow shaft of the post.

In one example, the lower stabilization device has at least one outer planar surface adapted to interface to an inner surface of the post to laterally stabilize the pole to restrict lateral movement of the lower stabilization device and the pole.

In one example, the lower stabilization device has a horizontal profile adapted to allow the lower stabilization device to pass between a wall of the post and a horizontal fence rail passing fully through the hollow shaft of the post.

In one example, the lower stabilization device can comprise a first plate body and a second plate body laterally opposing each other, and a first cross bar that extends inwardly from the first plate body to the pole attachment portion, and a second cross bar that extends inwardly from the second plate body to the pole attachment portion, such that the pole attachment portion is situated laterally between the first and second plate bodies.

In one example, the first and second plate bodies comprise respective outer planar surfaces that are substantially parallel to each other, and that are substantially parallel to a central longitudinal axis that extends through the post.

In one example, the at least one post support member of the upper stabilization device comprises a pair of opposing post support members interfaceable to opposing top edges of the top portion of the post to support a weight of the pole and the object.

In one example, the lower stabilization device is symmetrical about a central plane that extends through the pole attachment portion.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
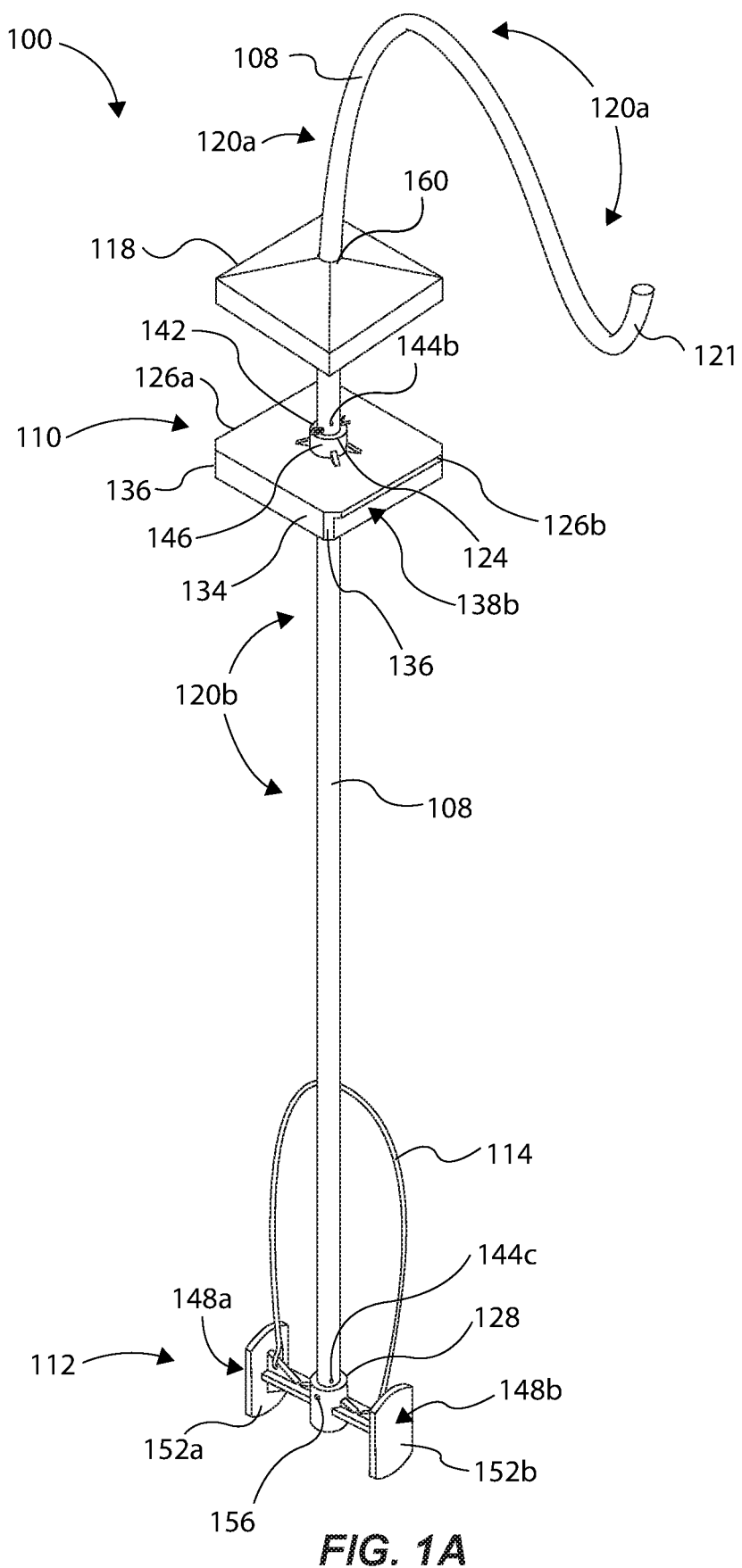
FIG. 1A is an isometric view of a hanger assembly, in accordance with an example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a member" includes reference to one or more of such features and reference to "coupling" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context, such as within about 5% and some cases within about 1%.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Post Hanger Assembly

Figure 2A:
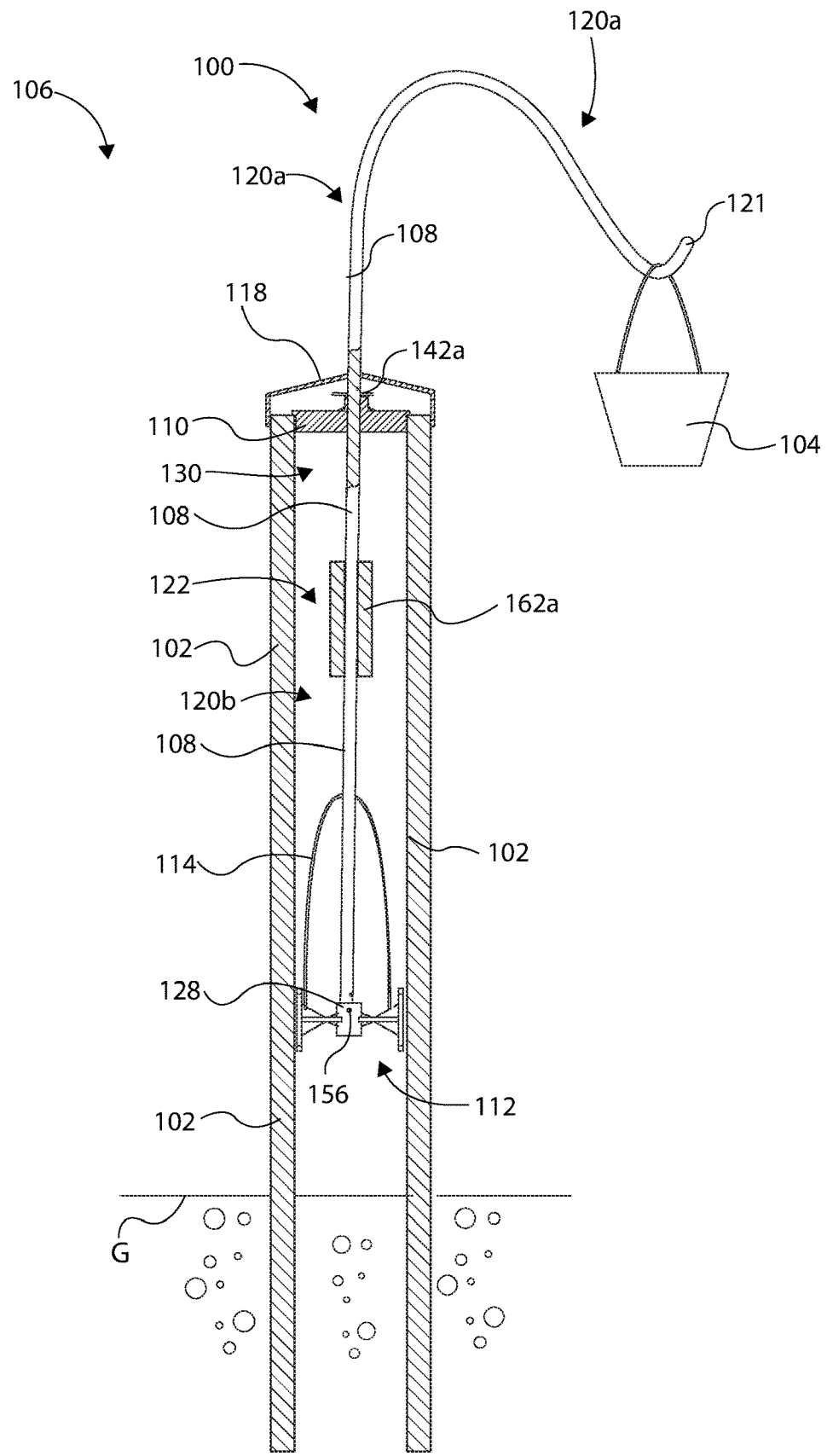
FIG. 2A is a side view of the hanger assembly of FIG. 1A, and installed or secured to a post and supporting an object, in accordance with an example of the present disclosure.

FIG. 1A is an isometric view of a hanger assembly 100 that can be installed to a post secured to the ground for hanging or supporting an object. FIGS. 2A-4 show one example of the hanger assembly 100 being installed to a post 102 secured to a ground surface G of a fence system 106 for supporting an object 104 (e.g., flower pot, bird feeder, light, flag, decoration, etc.). Note that the hanger assembly 100 of FIG. 1A can be installed to a post that is not part of a fence or fence system, such as a standalone post that is installed into the ground. As an overview, the hanger assembly 100 can comprise a pole 108, an upper stabilization device 110, and a lower stabilization device 112. The upper stabilization device 110 can be coupled to the pole 108 at an upper end for interfacing to the post 102, and the lower stabilization device 112 can be coupled to the pole 108 at a lower end. An optional grip device 114 can be attached to the lower stabilization device 112 for a user to grip and then lower or drop the lower stabilization device 112 (and the pole 108) through a hollow shaft 122 of the post 102 during installation, as further detailed below. The upper stabilization device 110 can be interfaced to or supported by the post 102. A top post cap 118, slidably interfaced to the pole 108, can be installed to cover the upper stabilization device 110 and the top of the post 102 (FIG. 2A). In this manner, the pole 108 and the object 104 are supported by the post 102 at two disparate locations, namely the first location being at the upper stabilization device 110, and the second location being the lower stabilization device 112 located at the end of the pole 108.

This configuration of the hanger assembly 100 installed or attached to the post 102 in this manner provides the benefit of concealing various support parts (e.g., 110, 112) of the hanger assembly 100 internally or inside of the post 102, while vertically and laterally supporting the object 104 by resisting bending moments imparted on the hanger assembly 100 when supporting the object 104, as further detailed below. This configuration further provides the benefit of the ability to install the hanger assembly 100 in a post that may have fence rails/stringer that extend through or into the post 102 (e.g., FIGS. 2A and 3), because of the shape, size, and profile of the lower stabilization device 112 that is capable of traversing past or along fence rails during installation, as further detailed below. These and other benefits should be appreciated from the descriptions further discussed below.

More specifically, the pole 108 can have an upper end section 120a configured to support the object 104, and a lower end section 120b configured to extend through a hollow shaft 122 of the post 102. The upper end section 120a can have an attachment end 121, such as a hook portion, for supporting a hanging object, such as a flower pot having a flexible line hanging from the hook portion. Thus, the pole 108 can be similar to a shepherd's hook type pole or rod having a linear section (e.g., lower end section 120b) that extends to a curvy section (e.g., upper end section 120a) having a hook for hanging an object. Thus, the attachment end 121 is configured to hang the object 104 laterally away from a central axis Y (FIG. 2C) of the linear section of the pole 108. However, in some cases, the pole 108 can be a straight pole to allow for attachment of various features. Other attachment end 121 shapes can include L-shape, straight, S-hook, C-curve, or the like.

Figure 1B:
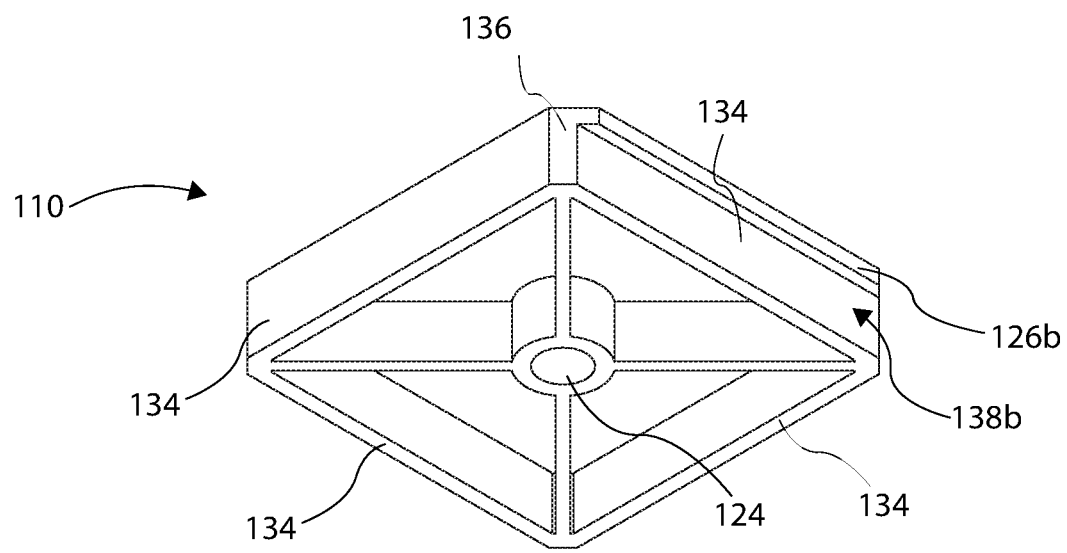
FIG. 1B is an isometric view of an upper stabilization device of the hanger assembly of FIG. 1A.
Figure 1C:
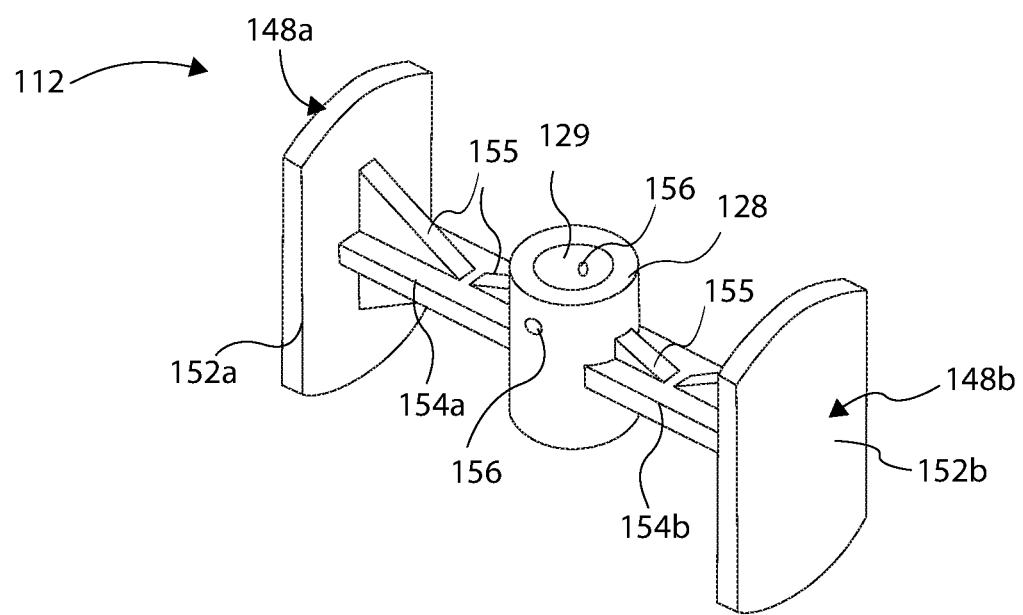
FIG. 1C is an isometric view of a lower stabilization device of the hanger assembly of FIG. 1A.

As an introduction to the details of the hanger assembly 100 of FIGS. 1A-1C, the upper stabilization device 110 can comprise a pole receiving aperture 124 (see also FIG. 2B) for receiving and coupling the pole 108 to the upper stabilization device 110. The pole 108 can be adhered, welded, pinned, clamped, or otherwise attached to the upper stabilization device 110 in a suitable manner, while extending centrally through the upper stabilization device 110 via the pole receiving aperture 124. Coupling can be sufficient to prevent the pole 108 from sliding through the aperture 124 during use. The upper stabilization device 110 can comprise first and second post support members 126a and 126b that interface with a top portion 132 (e.g., edge or surface) of the post 102 to at least partially support the weight of the pole 108 and the object 104, as shown and described below regarding FIG. 2B.

The lower stabilization device 112 can have a pole attachment portion 128 for coupling to the lower end section 120b of the pole 108. The pole attachment portion 128 can be in the shape of a tube having a cylindrical aperture 129 for receiving the pole 108. The cylindrical aperture 129 can extend all the way through the pole attachment portion 128, or it can be a counter bore that can be seated against the end of the pole 108 for attachment thereto. The pole attachment portion 128 can be threaded, welded, pinned, clamped, or otherwise attached to the end of the pole 108. As further discussed below, the lower stabilization device 112 is sized and shaped to be disposed through a top opening 130 of the hollow shaft 122 of the post 102, so that the lower stabilization device 112 can be lowered and traversed through the hollow shaft 122 during installation without obstruction.

Figure 2B:
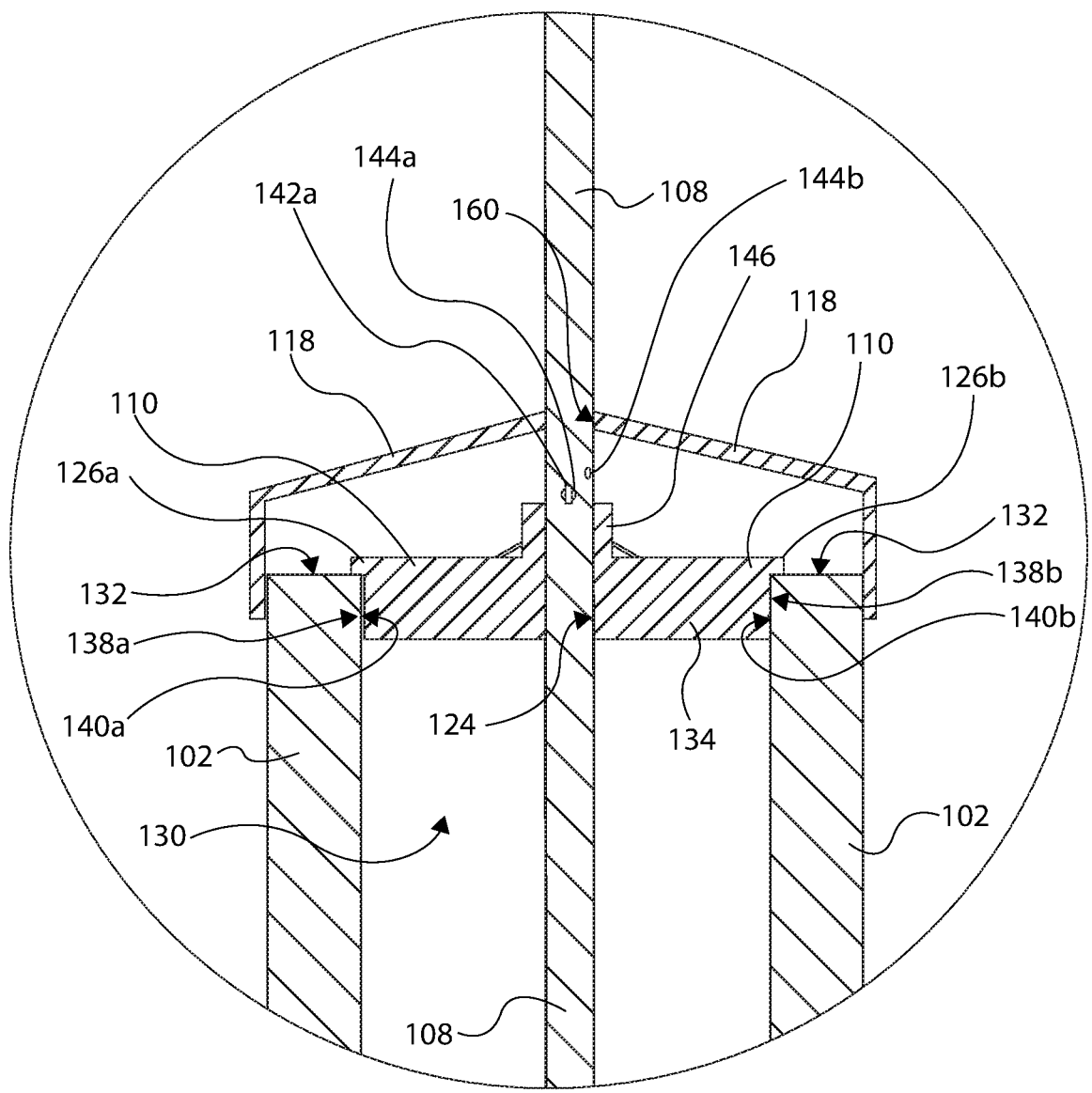
FIG. 2B is a close up view of an upper area of the hanger assembly and post of FIG. 2A.
Figure 2C:
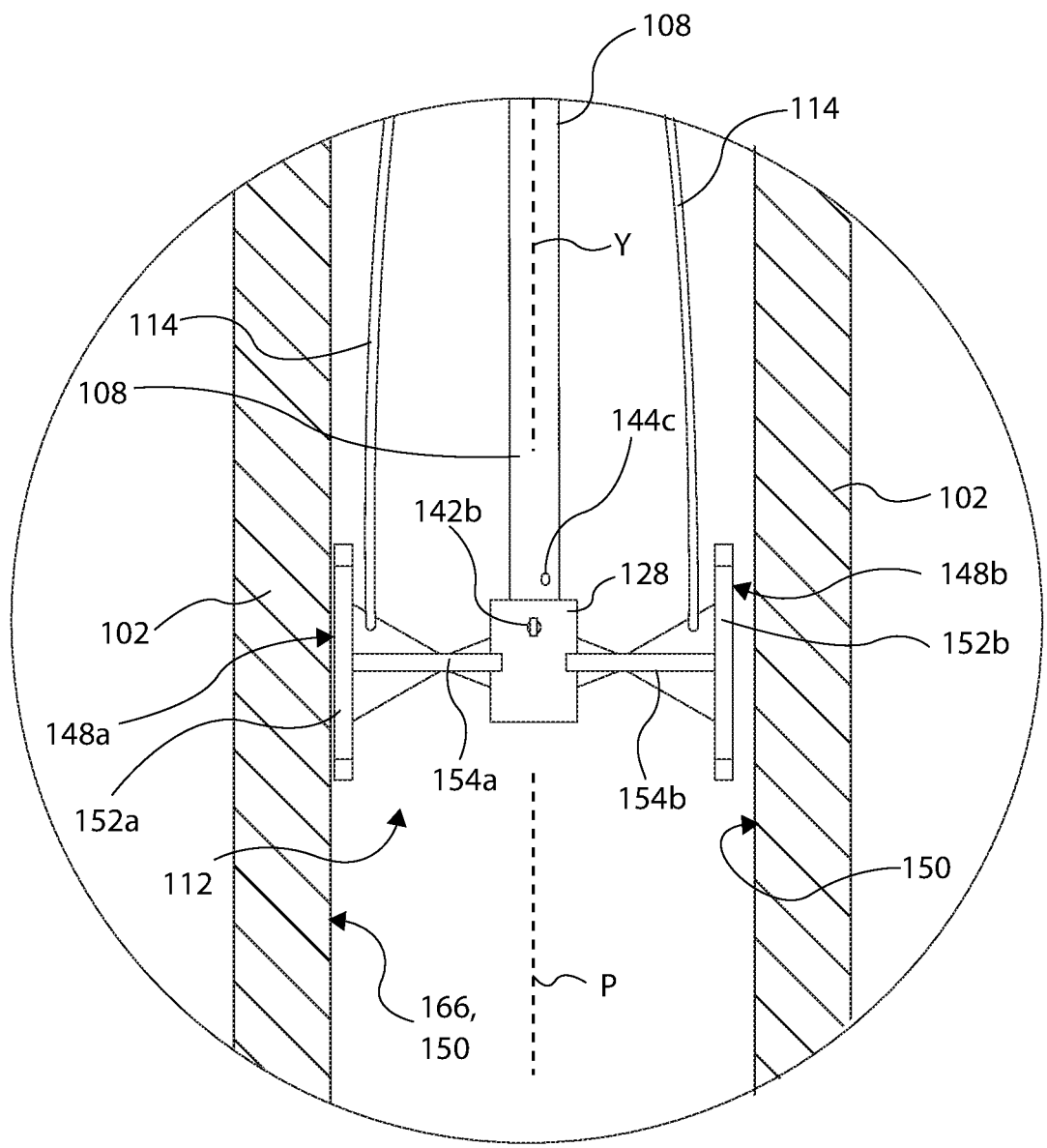
FIG. 2C is a close up view of a lower area of the hanger assembly and post of FIG. 2A.

With continued reference to FIGS. 2A-2C, for purposes of illustration clarity the upper stabilization device 110 is shown having cross sectional lines, as well as a section of pole 108 proximate the upper stabilization device 110. Meanwhile, the lower stabilization device 112 is shown as not having cross sectional lines, for purposes of illustration clarity, and to better show the orientation of the lower stabilization device 112. Further note that the post 102 and the top post cap 118 are shown as having cross sectional lines, so that the upper and lower stabilization devices 110 and 112 can be viewed as being inside of the post 102.

As shown in FIG. 2A, the upper stabilization device 110 can comprise the first and second post support members 126a and 126b, such as a flange or lip or shoulder, that each extend outwardly away from a center area of the upper stabilization device 110, and in opposing directions and sides from each other. Each of the first and second post support members 126a and 126b can be interfaced to the top portion 132 (e.g., upper edge or surface) of the post 102, so that the upper stabilization device 110 rests on top of the post 102, as shown. Thus, the upper stabilization device 110 may not be directed attached or secured to the post 102; rather, the upper stabilization device 110 can merely rest on top of the post 102, while a portion extends into the top opening 130 of the post 102. Alternatively, the upper stabilization device 110 can be secured to the post, such as by adhesive, fasteners, or other suitable means.

A lower support section 134 of the upper stabilization device 110 can have a square or rectangular perimeter cross sectional area that is sized to be received partially through the top opening 130 of the post 102, such that the first and second post support members 126a and 126b rest on the upper edge 132 of the post 102 when interfaced to the post 102. In one example, all four side corners 136 of the upper stabilization device 110 can be angled or chamfered so that the upper stabilization device 110 can more easily be slid down into the post 102 without corners interfering. The lower support section 134 of the upper stabilization device 110 can comprise first and second post interface surfaces 138a and 138b, which can be vertical planar surfaces parallel to each other, and that can interface to (or be proximate to) respective top inner surfaces 140a and 140b of the post 102 near the top opening 130. In this way, the upper stabilization device 110 can be snuggly or tightly fit into the top opening 130 of the post 102 (or it can be loosely fit, but within a one eighth of an inch tolerance, for instance).

As shown in FIG. 1A, an attachment device 142a (e.g., a cotter pin, pin, fastener, etc.) can be extended through a first aperture 144a formed laterally through the pole 108, so that the attachment device 142a is situated above the upper stabilization device 110, and so that the attachment device 142a has at least one exposed portion that extends outwardly from one or both sides of the post 102. In this manner, the exposed portion(s) of the attachment device 142a can rest on top of a collar portion 146 of the upper stabilization device 110. Thus, the attachment device 142a can prevent the pole 108 from sliding down through the upper stabilization device 110.

In one example, the pole 108 can have a second aperture 144b vertically separated from, and formed at an angle (e.g., less than 90 degrees) relative to, the first aperture 144a. The purpose of another aperture is so that a user can instead use the attachment device 142a through the second aperture 144b of the pole 108, thereby rotating and orienting the pole 108 at an angle (e.g., 45 degrees), as compared to the position shown in FIG. 2A. This optional positioning of the pole 108 can be useful in situations where the hanger assembly 100 is attached to a corner fence post (e.g., at a 90 degree turn in a fence line), so that the object 104 can hang from the pole 108 at an angle relative to the left and right fence rails attached to the post, which may be more aesthetically pleasing than if the object were hanging directly above one of the left or right fence rails.

Note that the upper stabilization device 110 can comprise just one post support member (e.g., a single flange) that extends outwardly about at least two continuous sides of the upper stabilization device 110. The upper stabilization device 110 can be formed of a rigid or semi-rigid material, such as metal, plastic, polymer, composite, or other suitable materials, and formed through machining, injection molding, printing, or other suitable means of manufacture. The upper stabilization device 110 can be a generally solid or uniform block or plate of material, or it can have cavities formed underneath that are defined by a number of trusses (e.g., FIG. 1B) for maximizing rigidity while minimizing weight or mass. Further note that the upper stabilization device 110 can be circular in shape for being received into circular posts. A particular upper stabilization device can alternatively be formed of a plurality of spokes or beams or rods that extend laterally from a central area of the upper stabilization device to interface or attach to the top edge of the post (i.e., the upper stabilization device need not be a block or plate).

Figure 4:
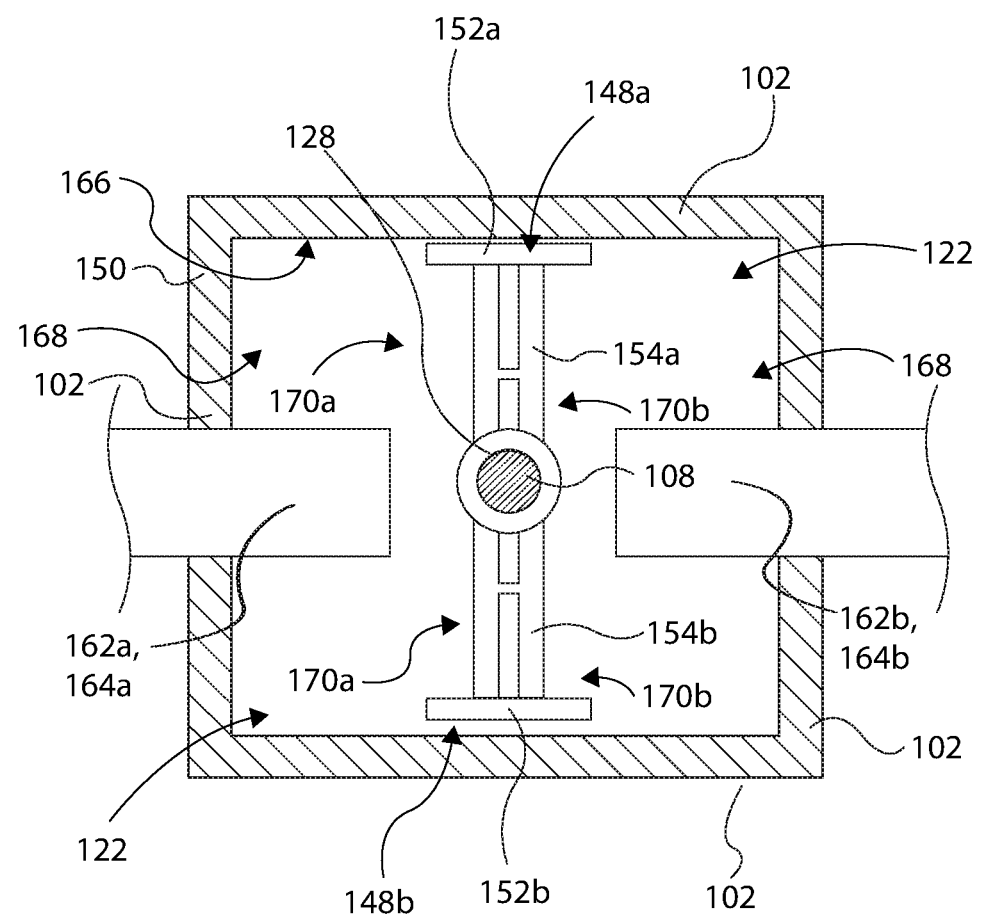
FIG. 4 is a cross sectional view of the post and the hanger assembly, taken along lines 4-4, of FIG. 3.

With continued reference to FIGS. 1C and 2C, the lower stabilization device 112 can comprise a first outer planar surface 148a adapted to interface to an inner surface 166 of a wall 150 of the post 102 (see also FIG. 4). This interface can laterally stabilize the pole 108 relative to the post 102 to restrict lateral movement of the lower stabilization device 112 and the pole 108. For example, using FIG. 2A as an illustration, the weight and location of the object 104 may impose a bending moment on the pole 108 at or near the lower stabilization device 112. Thus, the upper stabilization device 110 may somewhat act as a pivot point between the object 104 and the lower stabilization device 112, because of gravity acting on the object 104 that causes a rotational force on the pole 108 downwardly and to the right, i.e. clockwise (when viewing FIG. 2A). However, the first outer planar surface 148a of the lower stabilization device 112, being biased or interfaced to the inner surface 166 of the wall 150 of the post 102, can resist such bending moment acting on the pole 108. In this way, the pole 108 remains upright and the object 104 will not noticeably sag or lean over. This surface-to-surface contact interface between the first outer planar surface 148a and the inner surface 166 of the wall 150 reduces the stresses on the upper stabilization device 110, so that load stresses from the bending moment are distributed between both of the upper and lower stabilization devices 110 and 112. A degree of pole rotation about the upper stabilization device 110 can be controlled by adjusting a fit tolerance of the lower stabilization device 112 within the post 102. For example, fit tolerance can allow for movement less than 10% an internal horizontal width of the space within the post 102, and in most cases less than 5%, and in some cases substantially no movement. For example, tolerance may allow for simultaneous contact with opposing inner sidewalls of the post, or less than about 3 mm gap distance, and in some cases less than 1 mm gap distance.

Furthermore, the lower stabilization device 112 can comprise a first plate body 152a and a second plate body 152b laterally opposing each other on either sides of the lower stabilization device 112. The first and second plate bodies 152a and 152b may each be relatively larger, flat plates oriented vertically. The lower stabilization device 112 can comprise first cross bar 154a that extends inwardly from the first plate body 152a to one side of the pole attachment portion 128, and can comprise a second cross bar 154b that extend inwardly from the second plate body 152b to the other side of the pole attachment portion 128. Thus, the pole attachment portion 128 is situated laterally between the first and second plate bodies 152a and 152b. In this way, the lower stabilization device 112 can be substantially or generally symmetrical about a central plane P that extends vertically through the pole attachment portion 128 (and also symmetrical about a central longitudinal axis Y that extends through the lower end section of the pole 108). The lower stabilization device 112 can also be substantially or generally symmetrical about a horizontal plane orthogonal to the central plane P (with the exception of the small apertures 156 on the pole attachment portion 128).

Note that the first and second cross bars 154a and 154b can take various shapes and forms to maximize the rigidity and load characteristics of the lower stabilization device 112 to reduce stresses. For instance, the cross bars 154a and 154b can each include a number of flat bars or trusses 155 (FIG. 1C) extending in different directions between the respective plate bodies 152a and 152b the pole attachment portion 128, and some of the bars or trusses 155 can be triangular shaped to maximize rigidity.

The first and second plate bodies 152a and 152b each comprise respective outer planar surfaces 148a and 148b that are generally parallel to each other, and generally parallel to the central plane P and the inner surface 166 of the post 102. The lateral distance between the outer planar surfaces 148a and 148b can define an overall width of the lower stabilization device 112, which is shorter or less than a lateral distance of the hollow shaft 122 of the post 102 (see also FIG. 4). In this manner, the lower stabilization device 112 can be rotated 360 degrees within the post 102 during installation, as discussed below, without interference from the wall 150 of the post 102. The outer planar surfaces 148a and 148b further define a height of the lower stabilization device 112, which contributes to the relatively large surface area of the outer planar surface 148a and 148b that maximizes the surface-to-surface contact between the lower stabilization device 112 and the wall 150 of the post 102. Note that the lower stabilization device 112 can instead only comprise a single plate body (e.g., like 152a), and therefore may not be symmetrical about plane P. However, in the present example, forming two plate bodies 152a and 152b provides a bi-directional device that can be used in two directions, because either one of the first and second plate bodies 152a and 152b can be biased to an inner surface of the post 102 (which would depend on the direction of the upper end section 120a of the pole 108, and therefore the bending moment of the pole 108 due to the orientation and position of the object 104).

Regarding attaching the pole 108 to the lower stabilization device 112, an attachment device 142b, such as a cotter pin or other pin, can extend through opposing apertures 156 (FIG. 1C) of the pole attachment portion 128 of the lower stabilization device 112. The attachment device 142b would therefore extend through an aperture (not visible) formed laterally through the pole 108 (such aperture is formed in the same direction as the first aperture 144a of FIG. 2B proximate the upper stabilization device 110). In this manner, the attachment device 142b is used to removably couple the lower end of the pole 108 to the lower stabilization device 112. In one example, the pole 108 can have another aperture 144c vertically separated from, and formed at an angle (e.g., less than 90 degrees) in the same direction as aperture 144b proximate the upper stabilization device 110. In this way, a user can instead extend the attachment device 142b through the aperture 144c (while also doing the same operation described above with attachment device 142a through aperture 144b), which would rotate and orient the pole 108 at an angle (e.g., 45 degrees) relative to the post 102 (and as compared to the position shown in FIG. 2A). As a result of using these alternative apertures to rotate the pole 108 a certain degree, the upper and lower stabilization devices 110 and 112 would remain oriented in the positions shown in FIGS. 2A-2C, but the pole 108 would be rotated to a degree based on the direction of the apertures 144b and 144c formed through the pole 108 (such as 45 degrees).

Regarding installation of the hanger assembly 100 to the post 102 of the fence system 106, a user can slide the top post cap 118 onto the pole 108 from the lower end of the pole 108 via a central hole 160 formed through the top post cap 118. Then, the user can slide the upper stabilization device 110 onto the pole through the lower end of the pole 108 via the pole receiving aperture 124 of the upper stabilization device 110. The user can then attach the upper stabilization device 110 to the pole 108 via the attachment device 142a, as also discussed above. Then, the user can insert the lower end of the pole 108 into the cylindrical aperture 129 of the pole attachment portion 128, and then operate the attachment device 142b to attach the lower stabilization device 112 to the pole 108, as also discussed above. Once assembled in this manner, the user can grasp the grip 114 and then lower the lower stabilization device 112 into the hollow shaft 130 via the top opening 130 of the post 102. Once lowered a certain distance below an upper pair of horizontal fence rails 162a and 162b (FIG. 2A) of the fence system 106, for instance, the user can rotate the lower stabilization device 112 approximately 90 degrees to the position shown in FIGS. 2A, 3, and 4. This may require some of the arm of the user to extend down into the post 102 a certain distance while grasping and rotating the grip 114 to cause or facilitate rotation of the lower stabilization device 112. Then, the user can grasp the upper end section 120a of the pole 108 (and/or the upper stabilization device 110), and then insert the lower support section 134 of the upper stabilization device 110 into the top opening 130 of the post 102, such that the first and second post support members 126a and 126b rest on top of the top portion 132 of the post 102, as shown and described regarding FIG. 2B. Finally, the user can attach the top post cap 118 to an outer surface of the post 102, similarly as with a typical friction fit interface of a top cap to a hollow fence post. As a result, the pole 108 is laterally and vertically supported by the upper and lower stabilization devices 110 and 112 to effectively support the object 104.

Figure 3:
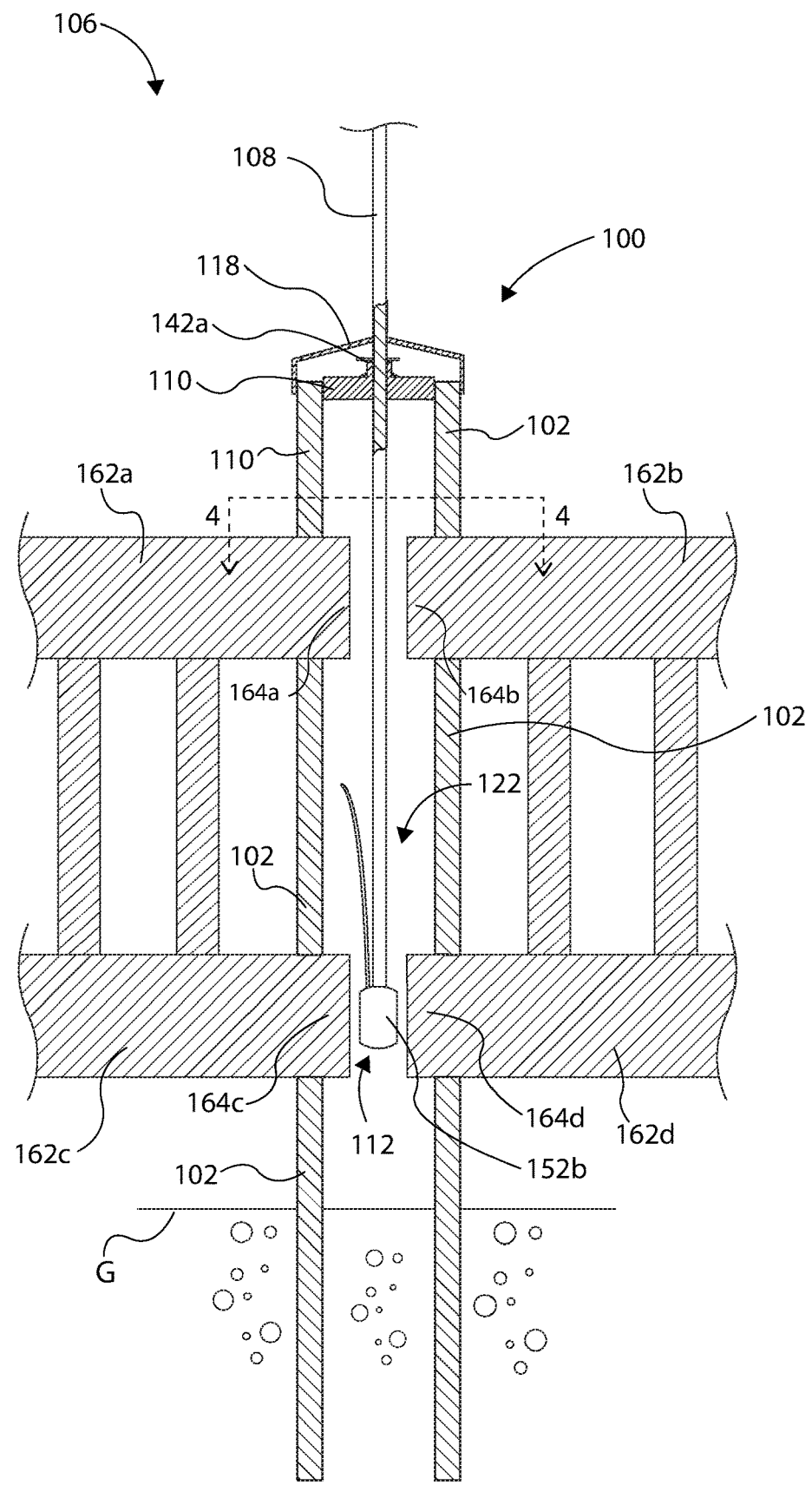
FIG. 3 is a front view of the hanger assembly and post of FIG. 2A.

As best shown in FIG. 3, the fence system 106 can comprise the upper pair of horizontal rails 162a and 162b attached to the post 102, and a lower pair of horizontal rails 162c and 162d attached to the post 102. Thus, the upper horizontal rails 162a and 162b can be coupled to either side of the post 102, such that respective interface support members 164a and 164b (i.e., ends of the rails 162a and 162b) extend at least partially into the hollow shaft 122 of the post 102, in a conventional manner. Similarly, the lower pair of horizontal rails 162c and 162d can be coupled to either side of the post 102, in a conventional manner. In other examples, only one horizontal rail can be coupled to one side of the post 102 (or even none at all). Most often, the rails extend completely through the post such that an obstruction across the hollow volume is formed by the rail. Accordingly, the lower horizontal rails 162c and 162d can comprise respective interface support members 164c and 164d that each extend at least partially into the hallow shaft 122 of the post 102. In one example, the post 102, the top cap 118, and the horizontal rails 162a-d are comprised of vinyl fence material, such as commercially available fence posts and related fence materials (e.g. vinyl, wood, composite, metal reinforced, metal, and the like).

Note that the upper and lower stabilization devices 110 and 112 can be spatially separated by a predefined distance along the pole 108, such as at least 6 inches, 10 inches, 12 inches, or in some cases at least 18 inches, depending on a pole 108 height above the post cap 118, supported weight, etc. Distally separating the upper and lower stabilization devices 110 and 112 in this manner can increase or spread out the contact points or areas that the hanger assembly 100 is coupled to the post 102, which reduces stresses of the upper and lower stabilization devices 110 and 112 when supporting the object 104.

As best shown in the top-down cross sectional view of FIG. 4, the lower stabilization device 112 has a horizontal profile adapted to allow the lower stabilization device 112 to pass between an inner surface 166 of the wall 150 of the post 102 and the interface support members 164a and 164b of the horizontal rails 162a and 162b passing at least partially through the hollow shaft 122 (when the lower stabilization device 112 is oriented 90 degrees relative to the view of FIG. 4 while being lowered into the post 102 and passed beyond either side of the rails 162a and 162b, as noted above). This is because of the relatively narrow profile of the lower stabilization device 112, which is defined by left and right side edges of the respective first and second plate bodies 152a and 152b. Thus, as described above, the lower stabilization device 112 can be inserted and lowered into the post 102 in a first rotational orientation (i.e., 90 degrees from what is shown in FIG. 4), and then passed along the horizontal rails 162a and 162b through gap 168 defined between the horizontal rails 162a and 162b and the inner surface 166 of the post 102. Then, by gripping and rotating the grip 114 approximately 90 degrees, the lower stabilization device 112 is caused to concurrently rotate 90 degrees and into the final orientation of FIGS. 2 and 4.

In one aspect, the lower stabilization device 112 can have side openings 170a and 170b sized to pass beyond interface support members 164a and 164b of horizontal rails 162a and 162b. This can be useful in examples where the horizontals rails 162a-d are coupled to respective sides of the post 102, such as with some snap-in rails, for instance. This is best shown on FIG. 3, showing a separation area between sides of the lower stabilization device 112 and the interface support members 164a-d of the horizontal rails 162a-d so that the lower stabilization device 112 can freely slide down the shaft during installation without being encumbered by the interface support members 164a-d. This can be achieved by forming the lower stabilization device 112 to be an I-shaped configuration, as shown in FIG. 4.

Other configurations are possible other than an I-shape of FIG. 4, such as an X-shape whereby ends of each prong of the X-shape interface near inside corner portions of the post. This shape can also have side openings that freely pass beyond interface portions of the horizontal rails.

The lower stabilization device can be formed larger than shown, such as slightly smaller than the cross sectional area of the post, so that the lower stabilization device can interface against all four inner surfaces of the post to resist such bending moments in respective directions. This shape of the lower stabilization device may be possible in scenarios where the hollow shaft does not have any rails or attachments extending into it (i.e., so that the lower stabilization device does not need rotated once lowered into the post).

In one example, the upper and/or lower stabilization devices are formed as part of the pole, and the top cap can be attached to the pole, such that the entire assembly can be manufactured as one assembly and ready for installation into a fence post. In another example, the top cap and the upper stabilization device can be one component that vertically stabilizes the pole and covers the top of the post. In some examples, the vertical section of the pole below the top cap can be a length of 6 inches up to 3 feet or more. In some examples, the lower stabilization device can rest on the ground surface inside the shaft.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A hanger assembly coupleable to a post to hang an object from the hanger assembly, comprising:
   a pole having an upper end section operable to support an object and a lower end section operable to extend through a hollow shaft of a post;
   an upper stabilization device having a pole receiving aperture adapted to receive and to non-slideably couple to the pole, and having at least one post support member interfaceable to a top portion of the post to at least partially support the pole; and
   a lower stabilization device having a pole attachment portion operable to couple to the lower end section of the pole, wherein the lower stabilization device is sized to be disposed through a top opening of the hollow shaft of the post.

2. The hanger assembly of claim 1, wherein the lower stabilization device has at least one outer planar surface adapted to interface to an inner surface of the post to laterally stabilize the pole to restrict lateral movement of the lower stabilization device and the pole.

3. The hanger assembly of claim 1, wherein the lower stabilization device has a horizontal profile adapted to allow the lower stabilization device to pass between a wall of the post and a horizontal fence rail passing fully through the hollow shaft of the post.

4. The hanger assembly of claim 1, wherein the lower stabilization device comprises at least one opening sized to freely pass beyond a post interface support member of a horizontal fence rail coupled to the post.

5. The hanger assembly of claim 1, wherein the lower stabilization device comprises a first plate body and a second plate body laterally opposing each other, and a first cross bar that extends inwardly from the first plate body to the pole attachment portion, and a second cross bar that extends inwardly from the second plate body to the pole attachment portion, such that the pole attachment portion is situated laterally between the first and second plate bodies.

6. The hanger assembly of claim 5, wherein the first and second plate bodies each comprise an outer planar surface operable to interface to an inner surface of the post to restrict movement of the pole.

7. The hanger assembly of claim 6, wherein the outer planar surfaces are substantially parallel to each other and to a central longitudinal axis that extends through the post.

8. The hanger assembly of claim 1, further comprising a grip device coupled to the lower stabilization device and operable for a user to grasp and then lower the lower stabilization device and the lower end section of the pole through the hollow shaft of the post during installation.

9. The hanger assembly of claim 8, wherein the grip device extends upwardly from the lower stabilization device, and is adapted to facilitate rotation of the lower stabilization device when the grip device is rotated by a user during installation.

10. The hanger assembly of claim 1, wherein the at least one post support member of the upper stabilization device comprises a pair of opposing post support members interfaceable to opposing top edges of the top portion of the post to support a weight of the pole and the object.

11. The hanger assembly of claim 1, wherein the pole comprises a shepherd's hook having a linear section that at least partially extends through the post, and having an attachment end adapted to hang the object laterally away from a central axis of the linear section of the pole.

12. The hanger assembly of claim 1, further comprising an attachment device operable to attach the pole to the upper stabilization device.

13. The hanger assembly of claim 12, wherein the attachment device comprises a pin that extends through an aperture of the pole to secure the pole to the upper stabilization device.

14. The hanger assembly of claim 1, wherein the upper and lower stabilization devices are spatially separated by a predefined distance along the pole.

15. The hanger assembly of claim 14, wherein the predefined distance is at least 12 inches.

16. The hanger assembly of claim 1, wherein the lower stabilization device comprises a pair of opposing outer planar surfaces laterally separated from each other a distance shorter than a lateral distance of the hollow shaft of the post.

17. The hanger assembly of claim 1, wherein the upper stabilization device comprises a pair of opposing planar side surfaces each interfaceable to respective top inner surfaces of the post to vertically support the pole.

18. The hanger assembly of claim 1, further comprising a top post cap having a central aperture for receiving the pole, wherein the top post cap is coupleable to the post to cover the hollow shaft and the upper stabilization device.

19. The hanger assembly of claim 1, wherein the lower stabilization device is symmetrical about a central plane that extends through the pole attachment portion.

20. The hanger assembly of claim 1, wherein the pole comprises a first lower aperture and a first upper aperture formed in the same direction, and each configured to receive an attachment device for securing the pole to the upper and lower stabilization devices in a first position relative to the post.

21. The hanger assembly of claim 20, wherein the pole comprises a second lower aperture formed at an angle relative to the first lower aperture, and a second upper aperture formed at an angle relative to the first upper aperture, wherein the second lower aperture and the second upper aperture are formed in a same direction and formed at an angle relative to the first lower aperture and the first upper aperture, wherein the second lower aperture and the second upper aperture are each configured to receive an attachment device for securing the pole to the upper and lower stabilization devices in a second position relative to the post, whereby the first and second positions are different from each other.

22. The hanger assembly of claim 1, wherein the post is a standard fence post and the upper stabilization device and the lower stabilization device are sized to engage within inner surfaces of the standard fence post.

* * * * *